US009446511B2

(12) United States Patent
Kuffner, Jr. et al.

(10) Patent No.: US 9,446,511 B2
(45) Date of Patent: *Sep. 20, 2016

(54) SYSTEMS AND METHODS FOR ALLOCATING TASKS TO A PLURALITY OF ROBOTIC DEVICES

(71) Applicant: Google Inc., Mountain View, CA (US)

(72) Inventors: James J. Kuffner, Jr., Mountain View, CA (US); Ryan Hickman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 14/645,135

(22) Filed: Mar. 11, 2015

(65) Prior Publication Data

US 2015/0185729 A1 Jul. 2, 2015

Related U.S. Application Data

(63) Continuation of application No. 13/757,810, filed on Feb. 3, 2013, now Pat. No. 9,008,839.

(60) Provisional application No. 61/595,872, filed on Feb. 7, 2012.

(51) Int. Cl.
*B25J 9/00* (2006.01)
*G06Q 10/06* (2012.01)
(Continued)

(52) U.S. Cl.
CPC ............. *B25J 9/0084* (2013.01); *B25J 9/1679* (2013.01); *G05B 19/4187* (2013.01);
(Continued)

(58) Field of Classification Search
CPC ................... B25J 9/0084; G05B 2219/39117; G05B 2219/39146; G05B 2219/40095; G06Q 10/06; G06N 3/008
See application file for complete search history.

(56) References Cited

U.S. PATENT DOCUMENTS 5,331,266 A * 7/1994 Widmann ............... G05B 19/19
318/13
5,615,138 A 3/1997 Tanaka et al.
(Continued)

FOREIGN PATENT DOCUMENTS

DE 102006017057 A1 * 10/2007 ............. G06Q 10/06

OTHER PUBLICATIONS

Google Translation of DE 102006017057 A1 (original DE document published Oct. 18, 2007).*
(Continued)

*Primary Examiner* — Behrang Badii
*Assistant Examiner* — David Testardi
(74) *Attorney, Agent, or Firm* — McDonnell Boehnen Hulbert & Berghoff LLP

(57) ABSTRACT

Methods and systems for allocating tasks to robotic devices are provided. An example method includes receiving information associated with task logs for a plurality of robotic devices and in a computing system configured to access a processor and memory, determining information associated with a health level for the plurality of robotic devices based on the information associated with the task logs. A health level for a given robotic device may be proportional to a current level of ability to perform a function, which may change over a lifespan of the given robotic device. Information associated with a plurality of tasks to be performed by one or more the robotic devices may also be determined. The computing system may optimize an allocation of the plurality of tasks such that a high precision task may be allocated to a robotic device having a greater current health level than another robotic device.

20 Claims, 7 Drawing Sheets

(51) Int. Cl.
*G05B 19/418* (2006.01)
*B25J 9/16* (2006.01)

(52) U.S. Cl.
CPC .... *G06Q 10/06* (2013.01); *G05B 2219/39117* (2013.01); *G05B 2219/39146* (2013.01); *G05B 2219/40095* (2013.01); *Y02P 90/205* (2015.11); *Y10S 901/01* (2013.01)

(56) References Cited

U.S. PATENT DOCUMENTS

| | | | |
|---|---|---|---|
| 6,230,079 B1* | 5/2001 | Brog.ang.rdh | B25J 9/1628 700/260 |
| 6,374,155 B1 | 4/2002 | Wallach et al. | |
| 6,598,174 B1 | 7/2003 | Parks et al. | |
| 7,117,067 B2 | 10/2006 | McLurkin et al. | |
| 7,580,847 B2* | 8/2009 | Black | G06Q 10/06 705/305 |
| 7,600,593 B2 | 10/2009 | Filippov et al. | |
| 7,826,984 B2* | 11/2010 | Sjostrand | B25J 9/1674 700/264 |
| 7,904,191 B2* | 3/2011 | Rossi | G05B 19/41865 700/100 |
| 7,920,962 B2 | 4/2011 | D'Andrea et al. | |
| 8,190,294 B2* | 5/2012 | Sjostrand | G05B 19/4063 700/245 |
| 8,285,417 B2 | 10/2012 | Kawaguchi et al. | |
| 8,386,078 B1 | 2/2013 | Hickman et al. | |
| 8,428,777 B1 | 4/2013 | Poursohi et al. | |
| 8,532,820 B1 | 9/2013 | Sampath | |
| 8,548,627 B2 | 10/2013 | Ulmer et al. | |
| 2003/0204788 A1 | 10/2003 | Smith | |
| 2003/0212472 A1* | 11/2003 | McKee | G05D 1/0274 700/245 |
| 2004/0162811 A1* | 8/2004 | Wetzer | G06Q 10/06315 |
| 2006/0126107 A1* | 6/2006 | Cheung | G06F 3/1208 358/1.15 |
| 2007/0118502 A1* | 5/2007 | Aragones | G06Q 10/06 |
| 2009/0037655 A1 | 2/2009 | Cherian et al. | |
| 2009/0228669 A1 | 9/2009 | Slesarev et al. | |
| 2009/0299789 A1* | 12/2009 | Black | G06Q 10/06 705/7.39 |
| 2010/0145514 A1 | 6/2010 | Kim et al. | |

OTHER PUBLICATIONS

Sugar, Thomas et al., "Multiple Cooperating Mobile Manipulators", Proceedings of the 1999 IEEE International Conference on Robotics and Automation, vol. 2, pp. 1538-1543.*

Stroupe, Ashley et al., "Sustainable cooperative robotic technologies for human and robotic outpost infrastructure construction and maintenance", Autonomous Robots, 2006, vol. 20, pp. 113-123.*

Uchiyama, Masaru et al., "A symmetric hybrid position/force control scheme for the coordination of two robots", Proceedings of the 1988 IEEE International Conference on Robotics and Automation, Apr. 24-29, 1988, vol. 1, pp. 350-356.*

Parker, Lynn, "Lifelong adaptation in heterogeneous multi-robot teams—response to continual variation in individual robot performance", Autonomour Robots 8, Copyright 2000 Kluwer Academic Publishers, pp. 239-267.

Book, Wayne J. et al., "Master-slave manipulator performance for various dynamic characteristics and positioning task parameters", IEEE Transactions on Systems, Man, and Cybernetics, vol. SMC-10 No. 11, Nov. 1980, pp. 764ff.

Chand, Praneel et al., "Task allocation and coordination for limited capability mobile robots", Proceedings of the Australasian Conference on Robotics and Automation, 2007, Brisbane, Australia, 10 pages.

DeLoach, Scott, "OMACS: a Framework for Adaptive Complex Systems", Handbook of Research on Multi-Agent Systems: Semantics and Dynamics of Organizational Models, Chapter 4, Virginia Dignum ed., 2009, pp. 76-104.

Gerkey, Brian Paul, "On multi-robot task allocation", CRES Technical Report CRES-03-012, U.S.C. Ph.D Dissertation, Aug. 2003, 126 pages.

Restelli, Marcello et al., "An Architecture to Implement Adaptive Cooperative Strategies for Heterogeneous Agents", Proceedings of the Workshop on Cooperative Robotics, 2002 IEEE/RSJ International Conference on Intelligent Robots and Systems (IROS'02), Oct. 2002, 8 pages.

Tsalatsanis, Athanasios et al., "Dynamic task allocation in cooperative robot teams", International Journal of Advanced Robotic Systems, vol. 6, No. 4, 2009, pp. 309-318.

Vander Weide, Scott A., "Dynamic task allocation in mobile robot systems using utility functions", Univ. Central Florida Master's Thesis, 2008, 116 pages.

Arumugan, Rajesh et al., DAvinCi: A Cloud Computing Framework for Service Robots, 2010 IEEE Conference on Robotics and Automation, Anchorage Convention District, Anchorage, Alaska, May 3-8, 2010.

Park, Juyi et al., Toward Intelligent System Health Monitoring for NASA Robonaut, 4th IEEE/RAS International Conference on Humanoid Robotics, 2004.

* cited by examiner

SYSTEMS AND METHODS FOR ALLOCATING TASKS TO A PLURALITY OF ROBOTIC DEVICES

CROSS-REFERENCE TO RELATED APPLICATIONS

This application is a continuation of U.S. patent application Ser. No. 13/757,810, filed on Feb. 3, 2013, and entitled "Systems and Methods for Allocating Tasks to a Plurality of Robotic Devices," which claims the benefit of U.S. Provisional Application No. 61/595,872 filed on Feb. 7, 2012, which are both herein incorporated by reference as if fully set forth in this description.

FIELD

This disclosure relates to robot cloud computing, and in examples, to allocating tasks to robotic devices in a robot-cloud interaction.

BACKGROUND

Cloud computing refers to provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service (or even an aggregation of existing cloud services) is "the cloud".

Cloud computing has been referred to as "client-server computing", however, there may be distinctions between general cloud computing and client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients (e.g., a one-to-one relationship or connection may not be required). Thus, cloud computing generally includes client-server computing, and additional services and functionality.

Cloud computing may free users from certain hardware and software installation and maintenance tasks through use of simpler hardware on the user's computer that accesses a vast network of computing resources (e.g., processors, hard drives, etc.). Sharing of resources may reduce cost to individuals. Thus, any computer connected to the cloud may be connected to the same pool of computing power, applications, and files. Users can store and access personal files such as music, pictures, videos, and bookmarks or play games or use productivity applications on a remote server rather than physically carrying around a storage medium, such as a DVD or thumb drive.

In one example, a client device may be a robotic device configured to perform one or more tasks. In some cases, a computer connected to the cloud may receive information from a pool of robotic devices performing various functions

SUMMARY

This disclosure discloses, inter alia, systems and methods for allocating tasks to robotic devices in a robot-cloud interaction.

In one example, a method is provided that comprises receiving information associated with task logs for a plurality of robotic devices. The task logs may include information associated with tasks performed by the plurality of robotic devices. The method may also include, in a computing system configured to access a processor and a memory, determining information associated with a health level for the plurality of robotic devices based on the information associated with the task logs. In some examples, a health level for a given robotic device may be proportional to a current level of ability of the given robotic device to perform a function and may change over a lifespan of the given robotic device. The method may further include determining information associated with a plurality of tasks to be performed by one or more of the plurality of robotic devices. A first task may be associated with a first amount of precision that is greater than a second amount of precision associated with a second task. According to the method, the computing system may optimize an allocation of the plurality of tasks to one or more robotic devices of the plurality of robotic devices based on the information associated with respective health levels for the plurality of robotic devices. For example, the first task may be allocated to a first robotic device having a first health level that is greater than a second health level of a second robotic device.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

In another example, a computer-readable memory having stored thereon instructions executable by a computing device to cause the computing device to perform functions is provided. The functions may comprise receiving information associated with task logs for a plurality of robotic devices. The task logs may include information associated with tasks performed by the plurality of robotic devices. The functions may also include determining information associated with a health level for the plurality of robotic devices based on the information associated with the task logs. In some examples, a health level for a given robotic device may be proportional to a current level of ability of the given robotic device to perform a function and may change over a lifespan of the given robotic device. The functions may further include determining information associated with a plurality of tasks to be performed by one or more of the plurality of robotic devices. A first task may be associated with a first amount of precision that is greater than a second amount of precision associated with a second task. In addition, the functions may include optimizing an allocation of the plurality of tasks to one or more robotic devices of the plurality of robotic devices based on the information associated with respective health levels for the plurality of robotic devices. For example, the first task may be allocated to a first robotic device having a first health level that is greater than a second health level of a second robotic device.

The computer readable memory may include a non-transitory computer readable medium, for example, such as computer-readable media that stores data for short periods of time like register memory, processor cache and Random Access Memory (RAM). The computer readable memory may also include non-transitory media, such as secondary or persistent long term storage, like read only memory (ROM), optical or magnetic disks, compact-disc read only memory (CD-ROM), for example. The computer readable memory may also be any other volatile or non-volatile storage systems. The computer readable memory may be considered a computer readable storage medium, for example, or a tangible storage medium.

In addition, circuitry may be provided that is configured to perform logical functions in any processes or methods described herein.

In still further examples, any type of devices may be used or configured to perform logical functions in any processes or methods described herein.

In another example, a system is provided that comprises a computing component, a plurality of robotic devices, and a maintenance component. The computing component may comprise a processor and a memory coupled to the processor and capable of communicating with the plurality of robotic devices over a network. The computing component may be configured to receive information associated with task logs and maintenance logs for the plurality of robotic devices. The task logs may include information associated with tasks performed by the plurality of robotic devices. The computing component may be further configured to determine information associated with a health level for the plurality of robotic devices based on the information associated with the task logs and the maintenance logs. In some examples, a health level for a given robotic device may be proportional to a current level of ability of the given robotic device to perform a function and may change over a lifespan of the given robotic device. The computing component may also be configured to receive information associated with a plurality of tasks to be performed by one or more the plurality of robotic devices. A first task may be associated with a first amount of precision that is greater than a second amount of precision associated with a second task. In addition the computing component may be configured to optimize an allocation of the plurality of tasks to one or more robotic devices of the plurality of robotic devices based on the information associated with respective health levels for the plurality of robotic devices. For example, the first task may be allocated to a first robotic device having a first health level that is greater than a second health level of a second robotic device.

The plurality of robotic devices of the system may be configured to receive information from the computing component via the network associated with instructions for performing one or more tasks. The plurality of robotic devices may also be configured to transmit information associated with a status of the one or more tasks to the computing component via the network. In one instance, the status may indicate whether the one or more tasks are completed. In addition, the maintenance component of the system may be configured to transmit information associated with repairs of the plurality of robotic device to the computing component via the network.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
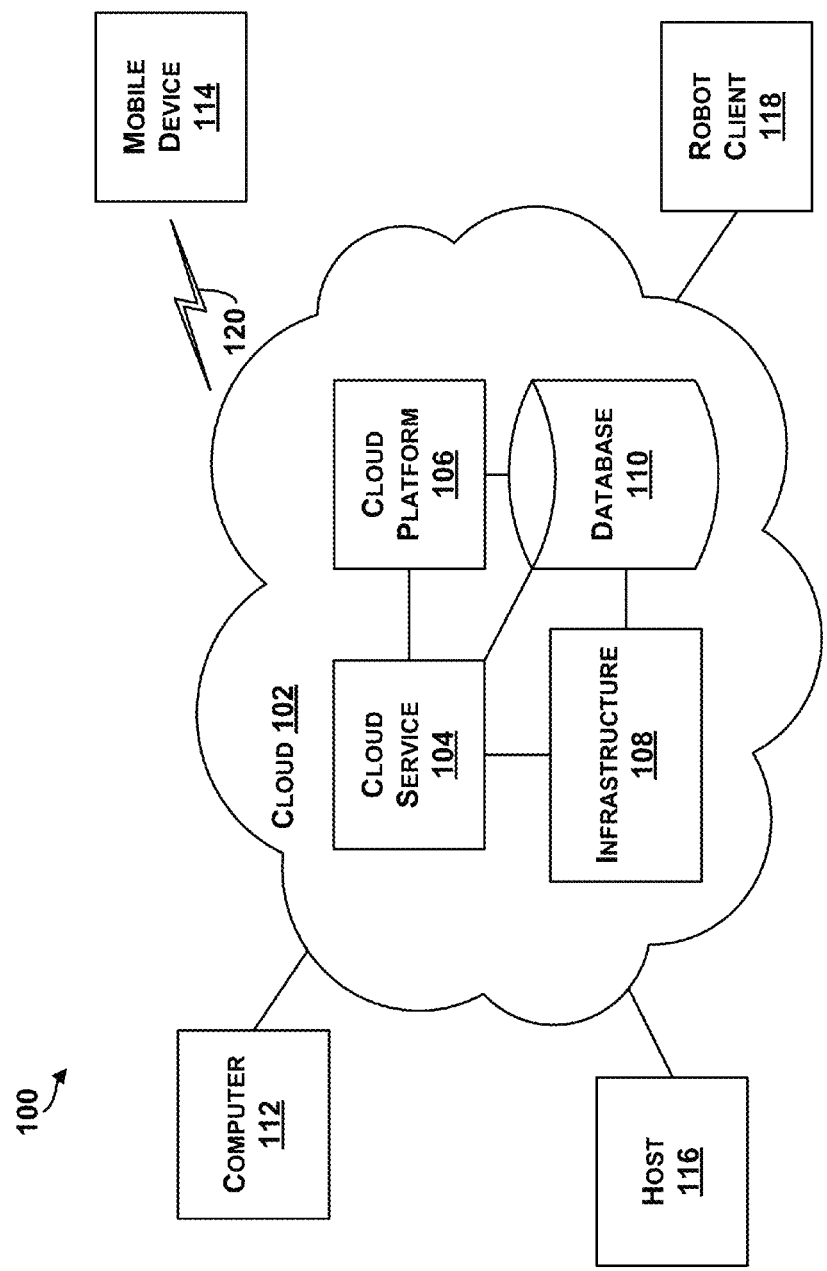
FIG. 1 is an example system for cloud-based computing.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure discloses, inter alia, methods and systems for allocating tasks to a plurality of robotic devices. An example method may include receiving information associated with task logs for a plurality of robotic devices. In some instances, the task logs may include information associated with tasks performed by the plurality of robotic devices. For example, information may indicate a given robotic device may have previously performed a given task a number of times. In one instance, the information associated with the task logs may indicate tasks performed by one or more of the plurality of robotic devices that caused a robotic device to malfunction or need repair. In one example, the information may include an indication of whether a task assigned to a given robotic device was completed.

Other example information associated with the task logs may include information indicating tasks or functions a given type of robotic device is capable of performing. A further example includes information associated with how and/or when capabilities of a given robotic device (or type of robotic device) degrade over time. For instance, performance of a motor of a robotic device may decrease after performing a given task a certain number of times, or gears associated with a robotic device may degrade over time, leading to a decreased ability to perform a function or move in a precise manner.

The example method may also include a computing system, configured to access a processor and a memory, determining information associated with a health level for the plurality of robotic devices. For example, the information associated with a health level for a given robotic device may be determined based on the information associated with the task logs. In some examples, a health level for a given robotic device may be proportional to a current level of ability of the given robotic device to perform a function. For example, the ability may change over a lifespan of the robotic device and the information associated with the respective health level may reflect a level of ability at one instance in time that may be different than another level of ability associated with another time when the robotic device was new, repaired, or recalibrated.

The method may also include determining information associated with a plurality of tasks to be performed by one or more of the plurality of robotic devices. In one instance, a first task may be associated with a first amount of precision used to perform the first task, and a second task may be associated with a second amount of precision. The first amount of precision may be greater than the second amount in some instances.

The computing system may also optimize an allocation of the plurality of tasks to one or more robotic devices of the plurality of robotic devices based on the information associated with respective health levels for the plurality of robotic devices. In an instance in which the first task is associated with an amount of precision that is greater than the second amount associated with the second task, the first task may be allocated to a first robotic device having a first health level that is greater than a second health level of the second robotic device.

In another example, information associated with capabilities of the plurality of robotic devices may be determined. For example, a determination may be made based on analysis of previous performances of the plurality of robotic devices or similar robotic devices. In yet another example, scheduling of maintenance appointments for the plurality of robotic devices may be optimized based on the information associated with respective health levels for the plurality of robotic devices.

In some examples, real-time information may be received from a group or each of the plurality of robotic devices indicating a status of the plurality of robotic devices. For example, a status of a given robotic device may indicate an availability to perform a task. In some instances, the real-time information, combined with the determined information associated with health levels for the plurality of robotic devices may be used to optimize the allocation of the plurality of tasks to one or more of the robotic devices. Thus, in some instances, the plurality of tasks may be allocated based on current conditions of one or more robotic devices and/or historical performances of the one or more robotic devices in order to match a health level of a robotic device with an amount of precision associated with performing a function or task.

Referring now to the figures, FIG. 1 is an example system 100 for cloud-based computing. Cloud-based computing generally refers to networked computer architectures in which application execution and storage may be divided, to some extent, between client and server devices. A "cloud" may refer to a service or a group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium.

As an example, in contrast to a predominately client-based or server-based application, a cloud-based application may store copies of data and/or executable program logic at remote server devices, while allowing client devices to download at least some of this data and program logic as needed for execution at the client devices. In some examples, downloaded data and program logic can be tailored to capabilities of specific client devices (e.g., a personal computer, tablet, or mobile phone, or robot) accessing the cloud based application. In addition, dividing application execution and storage between the client and server devices allows more processing to be performed by the server devices taking advantage of server devices processing power and capability, for example.

Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

In FIG. 1, a cloud 102 includes a cloud service 104, a cloud platform 106, a cloud infrastructure 108, and a database 110. The cloud 102 may include more or fewer components, and each of the cloud service 104, the cloud platform 106, the cloud infrastructure 108, and the database 110 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services and three-tier architectures, for example.

The cloud 102 may represent a networked computer architecture, and in one example, the cloud service 104 represents a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of billing components of the cloud 102, and thus, may interact with the cloud service 104. The database 110 may represent storage capabilities by the cloud 102, and thus, may be accessed by any of the cloud service 104, the cloud platform 106, and/or the cloud infrastructure 108.

The system 100 includes a number of client devices coupled to or configured to be capable of communicating with components of the cloud 102. For example, a computer 112, a mobile device 114, a host 116, and a robot client 118 are shown coupled to the cloud 102. Of course, more or fewer client devices may be coupled to the cloud 102. In addition, different types of client devices may be coupled to the cloud 102. For example, any of the client devices may generally comprise a display system, memory, and a processor.

The computer 112 may be any type of computing device (e.g., PC, laptop computer, etc.), and the mobile device 114 may be any type of mobile computing device (e.g., laptop, mobile telephone, cellular telephone, etc.).

The host 116 may be any type of computing device or transmitter including a laptop computer, a mobile telephone, etc., that is configured to transmit data to the cloud 102.

The robot client 118 may comprise any computing device that has connection abilities to the cloud 102 and that has an actuation capability (e.g., electromechanical capabilities). A robot may further be a combination of computing devices. In some examples, the robot 118 may collect data and upload the data to the cloud 102. The cloud 102 may be configured to perform calculations or analysis on the data and return processed data to the robot client 118. In some examples, as shown in FIG. 1, the cloud 102 may include a computer that is not co-located with the robot client 118. In other examples, the robot client 118 may send data to a second client (e.g., computer 112) for processing.

Any of the client devices may include additional components. For example, the robot client 118 may include one or more sensors, such as a gyroscope or an accelerometer to measure movement of the robot client 118. Other sensors may further include any of Global Positioning System (GPS) receivers, encoders, infrared sensors, optical sensors, biosensors, Radio Frequency identification (RFID) systems, wireless sensors, and/or compasses, among others, for example.

In addition, any of the client devices may include an integrated user-interface (UI) that allows a user to interact with the device. For example, the robot client 118 may include various buttons and/or a touchscreen interface that allow a user to provide input. As another example, the robot client device 118 may include a microphone configured to receive voice commands from a user. Furthermore, the robot client 118 may include one or more interfaces that allow various types of user-interface devices to be connected to the robot client 118.

In FIG. 1, communication links between client devices and the cloud 102 may include wired connections, such as a serial or parallel bus. Communication links may also be wireless links, such as link 120, which may include Bluetooth, IEEE 802.11 (IEEE 802.11 may refer to IEEE 802.11-2007, IEEE 802.11n-2009, or any other IEEE 802.11 revision), or other wireless based communication links.

In other examples, the system 100 may include access points through which the client devices may communicate with the cloud 102. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the client devices may include a wired or wireless network interface through which the client devices can connect to the cloud 102 (or access points). As an example, the client devices may be configured use one or more protocols such as 802.11, 802.16 (WiMAX), LTE, GSM, GPRS, CDMA, EV-DO, and/or HSPDA, among others. Furthermore, the client devices may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

Figure 2A:
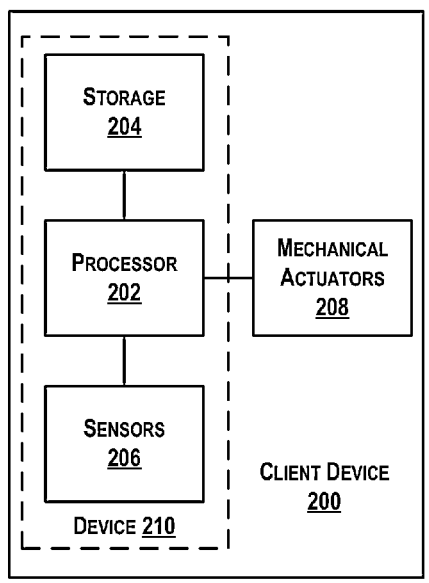
FIGS. 2A-2C are example illustrations of robotic devices.
Figure 2B:
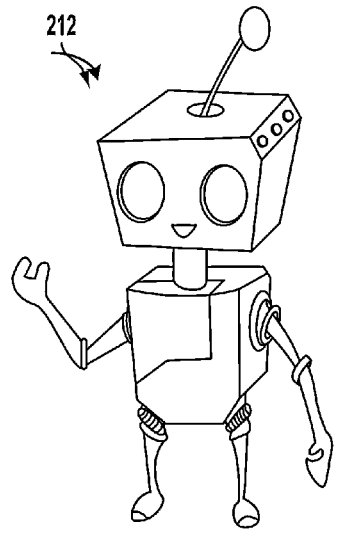
Figure 2C:
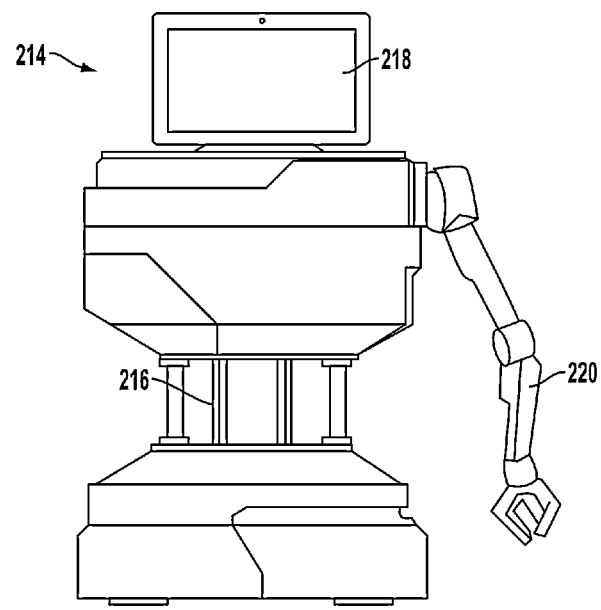

FIGS. 2A-2C are example illustrations of robotic devices. Any of the robots illustrated in FIGS. 2A-2C may be configured to operate according to example methods described herein, or according to instructions received from devices that may be configured to operate according to example methods described herein.

An example illustration of a robotic device 200 is shown in FIG. 2A. In one example, the robotic device 200 is configured as a robot. In some examples, a robot may contain computer hardware, such as a processor 202, memory or data storage 204, and one or more sensors 206. For example, a robot controller (e.g., processor 202, computing system, and sensors 206) may all be custom designed for a specific robot. The robot may have a link to access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robotic device 200 and storing program instructions. The processor 202 may be coupled to the storage 204 and may be configured to control the robotic device 200 based on the program instructions. The processor 202 may also be able to interpret data from the various sensors 206 on the robot. Example sensors may include a camera, smoke sensors, light sensors, radio sensors, infrared sensors, microphones, speakers, gyroscope, accelerometer, distance sensors, encoders, a camera, radar, capacitive sensors and touch sensors, etc. Example distance sensors include infrared ranging sensors, photoelectric distance sensors, proximity sensors, ultrasonic sensors, radar, or other types of sensors that may provide outputs used to determine a distance of the robotic device 200 to an object.

The robotic device 200 may also have components or devices that allow the robotic device 200 to interact with an environment of the robotic device 200. For example, the robotic device 200 may have a camera to provide images of a field of view of the environment as well as mechanical actuators 208, such as motors, wheels, movable arms, etc., that enable the robotic device 200 to move or interact with the environment.

In some examples, various sensors and devices on the robotic device 200 may be modules. Different modules may be added or removed from the robotic device 200 depending on requirements. For example, in a low power situation, a robot may have fewer modules to reduce power usages. However, additional sensors may be added as needed. To increase an amount of data a robot may be able to collect, additional sensors may be added, for example.

In some examples, the robotic device 200 may be configured to receive a device, such as device 210, that includes the processor 202, the storage 204, and the sensors 206. For example, the robotic device 200 may be a robot that has a number of mechanical actuators (e.g., a movable base), and the robot may be configured to receive a mobile telephone to function as the "brains" or control components of the robot. The device 210 may be considered a module of the robot. The device 210 may be physically attached to the robot or in communication with the robot. For example, a mobile phone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a mobile phone to download the routine from the cloud. When the mobile phone is placed into or coupled to the robot, the robot would be able to perform the downloaded action.

In some examples, the robotic device 200 may be coupled to a mobile or cellular telephone to provide additional sensing capabilities. The cellular phone may not be physically attached to the robot, but may be coupled to the robot wirelessly. For example, a low cost robot may omit a direct connection to the internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the robotic device 200 may include mechanical robot features, and may be configured to receive the device 210 (e.g., a mobile phone), which can provide additional peripheral components to the robotic device 200, such as any of an accelerometer, gyroscope, compass, GPS, camera, WiFi connection, a touch screen, etc., that are included within the device 210.

FIG. 2B illustrates a graphical example of a robot 212. In FIG. 2B, the robot 212 is shown as a mechanical form of a person including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting the device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

FIG. 2C illustrates another example of a robot 214. The robot 214 includes a computing device 216, sensors 218, and a mechanical actuator 220. In this example, the computing device 216 may be a laptop computer, which may be coupled to the sensors 218. The sensors 218 may include a camera, infrared projectors, and other motion sensing or vision sensing elements. The sensors 218 may be included within a tablet device, which may also function as the computing device 216. The mechanical actuator 220 may include a base, wheels, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); as well as proprietary software, and other examples also include ROSJAVA. A robot operating system may include publish and subscribe functionality, and may also include functionality to control components of the robot, such as head tracking, base movement (e.g., velocity control, navigation framework), etc.

Figure 3:
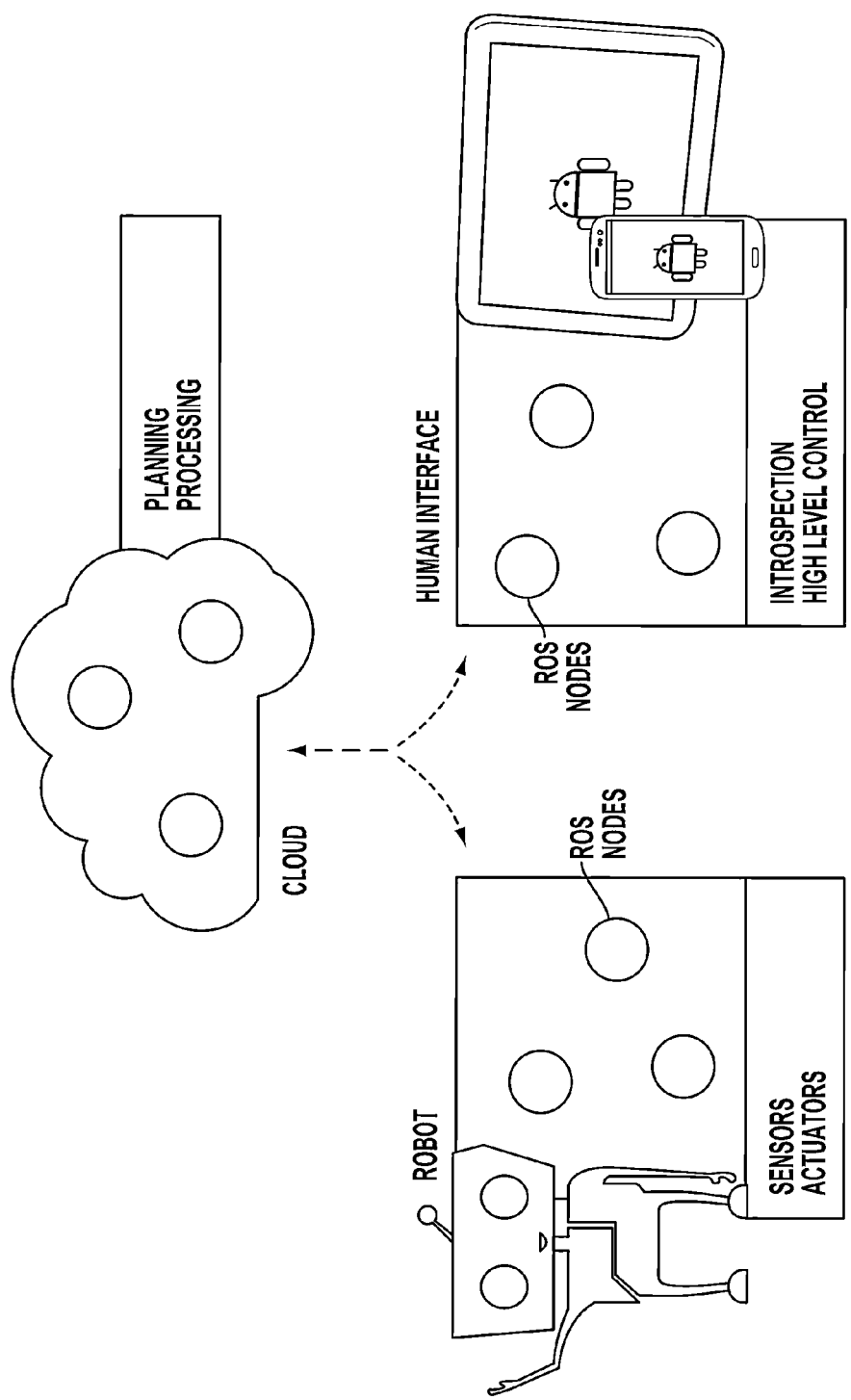
FIG. 3 illustrates an example of a conceptual robot-cloud interaction.

FIG. 3 illustrates an example of a conceptual robot-cloud interaction. A robot, such as a robot described and illustrated in FIG. 2, may connect to a network of computers (e.g., the cloud), and may request data or processing to be performed by the cloud. In one example, the robot may include a number of sensors and mechanical actuators that may generally provide motor control for the robot. Outputs of the sensors, such as camera feeds, vision sensors, etc., may be provided to the cloud, which can process the outputs to enable the robot to perform functions. The cloud may process a camera feed, for example, to determine a location of a robot, perform object recognition, or to indicate a navigation pathway for the robot.

FIG. 3 generally illustrates motor controllers in which each module may conceptually represent a computer or node on the cloud that performs processing using motor controller inputs or data from the robot. FIG. 3 also generally illustrates sensors in which each module may conceptually represent a computer or node on the cloud that performs processing using sensor inputs or data from the robot. FIG. 3 further generally illustrates applications in which each module may conceptually represent a computer or node on the cloud that performs specific functions of a number of applications, e.g., navigation application, mapping application, etc. In addition, FIG. 3 further generally illustrates planning in which each module may conceptually represent a computer or node on the cloud that performs processing for the robot, such as general planning or computing processing.

As shown, any of the modules may be interconnected, and/or may communicate to receive data or instructions from each other so as to provide a specific output or functionality for the robot.

In one example, the robot may send data to a cloud for data processing, and in another example, the robot may receive data from the cloud. The data received from the cloud may be in many different forms. The received data may be a processed form of data the robot sent to the cloud. The received data may also come from sources other than the robot. For example, the cloud may have access to other sensors, other robots, and the internet.

Figure 4:
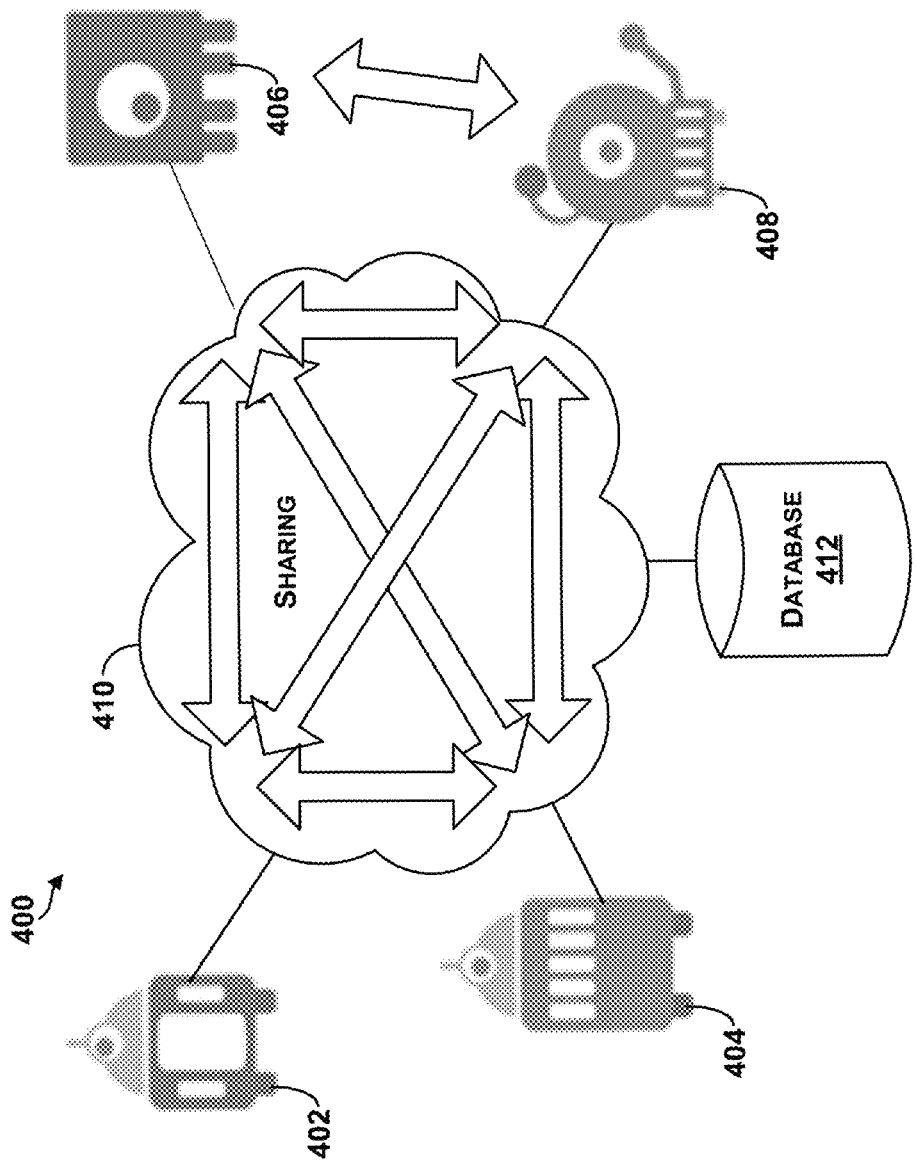
FIG. 4 is an example system in which robotic devices may interact with the cloud and share information with other cloud computing devices.

FIG. 4 is an example system 400 in which robots may interact with the cloud and share information with other cloud computing devices. The system 400 illustrates robots 402, 404, 406, and 408 (e.g., as conceptual graphical representations) each coupled to a cloud 410. Each robot 402, 404, 406, and 408 may interact with the cloud 410, and may further interact with each other through the cloud 410, or through other access points and possibly directly (e.g., as shown between robots 406 and 408).

The cloud 410 may receive input from several robots. Data from each robot may be compiled into a larger data set. For example, the robot 402 may take a picture of an object and upload the picture to the cloud 410. An object recognition program in the cloud 410 may be configured to identify the object in the picture and provide data to all the robots connected to the cloud 410 about the recognized object, as well as possibly about other characteristics (e.g., metadata) of the recognized object, such as a location, size, weight, color, etc. Thus, every robot may be able to know attributes of an object in a photo uploaded by the robot 402.

The robots 402, 404, 406 and 408 may perform any number of actions with an area, people, other robots, etc. In one example, each robot 402, 404, 406 and 408 has WiFi or other network based connectivity and will upload/publish data to the cloud 410 that can then be shared with any other robot. In this manner, each robot 402, 404, 406 and 408 shares experiences with each other to enable learned behaviors. Each robot 402, 404, 406, and 408 will have access to real-time, up-to-date data. Overall, the robots 402, 404, 406, and 408 may be configured to share data that is collected to enable faster adaptation, such that each robot 402, 404, 406, and 408 can build upon a learned experience of a previous robot.

The database 412 may be accessible by all robots through the cloud 410 (or alternatively directly accessible by all robots without communication through the cloud 410). The database 412 may thus be a shared knowledge base stored in the cloud 410. In some examples, robots may share learned behaviors through the cloud 410. The cloud 410 may have a server that stores robot-learned activities or behaviors resulting in a shared knowledge base of behaviors and heuristics for object interactions (e.g., a robot "app store").

Thus, within examples, the robots 402, 404, 406, and 408 may share information through the cloud 410, and may access the database 412. The robots 402, 404, 406, and 408 may access the cloud 410 to perform any number of functions or methods described herein.

In one example, a computing system, such as a computing component in the cloud or a computing component of a robotic device connected to a fleet of robotic devices, may receive information associated with a plurality of tasks to be performed by a plurality of robotic devices.

Figure 5:
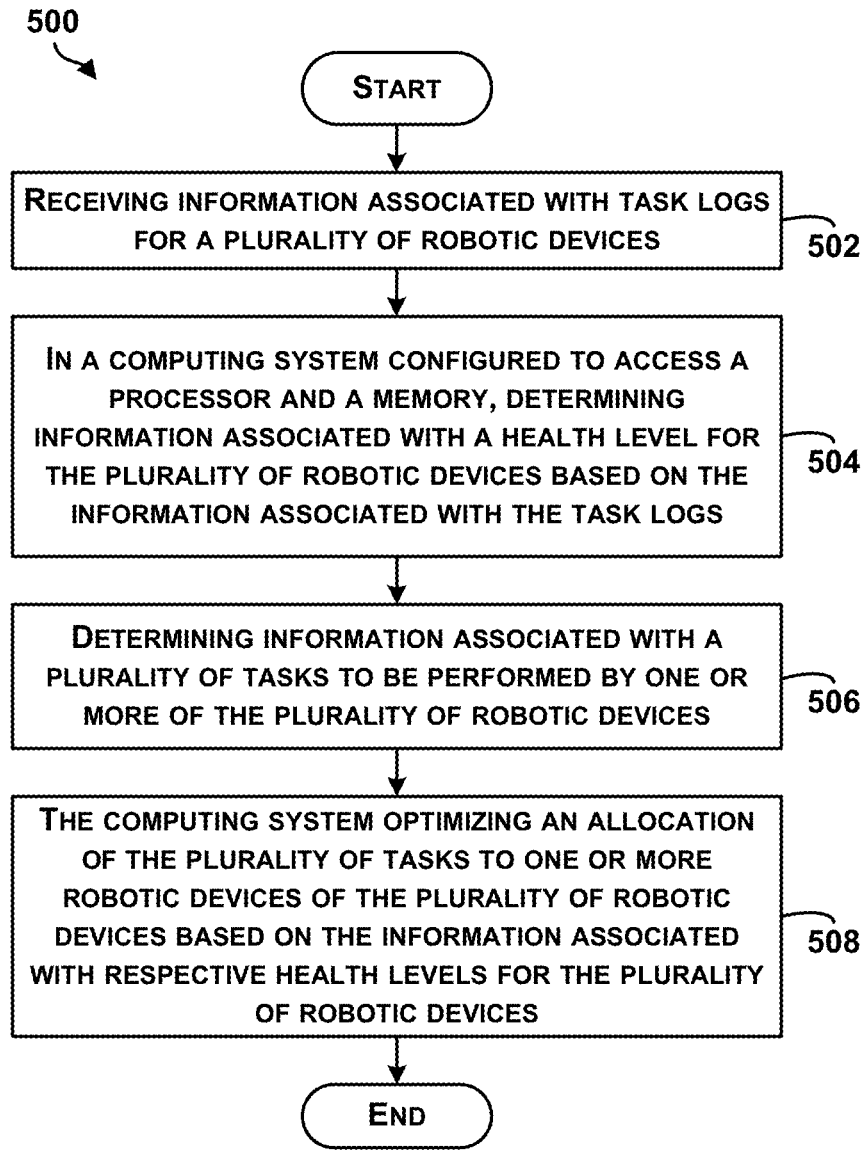
FIG. 5 is a block diagram of an example method of allocating tasks to a plurality of robotic devices.

FIG. 5 is a block diagram of an example method 500 of allocating tasks to a plurality of robotic devices. Method 500 shown in FIG. 5 presents an embodiment of a method that could be used with the system 100, for example, and may be performed by a device, such as any devices illustrated in FIGS. 1-2, or components of the devices. Method 500 may include one or more operations, functions, or actions as illustrated by one or more of blocks 502-508. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 500 and other processes and methods disclosed herein, each block in FIG. 5 may represent circuitry that is wired to perform the specific logical functions in the process.

At block 502, the method 500 includes receiving information associated with task logs for a plurality of robotic devices. In one example, the plurality of robotic devices may publish task statuses, associated with tasks or functions assigned to and performed by the plurality of robotic devices, to a database. The database may also include information from other robotic devices similar to the robotic devices. Other types of information associated with the task logs may include information indicating what tasks or types of tasks a robotic device is capable of performing. For example, a given robotic device may be capable of performing a repetitive task with a given amount of tolerance accompanying a result of the task or navigating with a given amount of precision. In other examples, a given robotic device may have performed tasks involving lifting objects adhering to size or weight constraints or transporting objects. Still other types of information associated with the task logs may include information indicating an amount of precision associated with performance of one or more tasks. In one instance, the amount of precision may be an ideal amount of precision (e.g., an amount of precision that a new robotic device of a given type could demonstrate). In another instance, the amount of precision may be a real-time measure that takes into consideration the current state of the robotic device given the effects of "wear and tear" or the like on the robotic device.

The information associated with the task logs may be received at a server residing in the cloud, at a computing device coupled to a robotic device, and/or at a robotic device, for example.

At block 504, the method 500 includes in a computing system configured to access a processor and a memory determining information associated with a health level for the plurality of robotic devices based on the information associated with the task logs. In one example, a health level for a given robotic device may be proportional to a current level of ability of the given robotic device to perform a function. For instance, the current level of ability of the given robotic device to perform a function may be determined based on a current amount of precision the robotic device is capable of performing the function with.

In some instances, a robotic device that is new or unused may have a first level of ability; however, analyzing the information associated with the task logs may indicate that at a time after the robotic device has performed the task a certain number of times, the robotic device may have a second level of ability that is lower than the first level. For example, the first level may be associated with an ability to perform a given task repeatedly generating a result that is repeatable within a first amount of tolerance. The second level may be associated with a result that is repeatable within a second amount of tolerance that is greater than the first amount (i.e., a less precise result). In one instance, the decrease in ability may be due to wear and tear caused by previous performances of the task. Thus, the ability may change over time throughout a lifespan of the robotic device.

In some examples, the information associated with the respective health levels for the plurality of robotic devices may include or reflect an estimate of an expected remaining lifespan for one or more or each of the robotic devices. For example, based on data mining (or other types of analysis) of the information associated with the task logs, an estimate of a time of failure, need for maintenance work, etc. may be determined by the computing system. In one instance, the estimate may be a relative metric with respect to the plurality of robotic devices. In other instances, the estimate may be an absolute amount of time or a future date.

The computing system may determine the information associated with the health level for the plurality of robotic devices by querying a database and receiving the information. Alternatively, the computing system may make the determination by processing data received from the plurality of robotic devices such as to determine successes and failures of completion of prior tasks and optionally a degree of precision with which tasks are completed.

At block 506, the method 500 includes determining information associated with a plurality of tasks to be performed by one or more of the plurality of robotic devices. In one example, the information associated with the plurality of tasks may include information regarding amounts of precision associated with one or more of the tasks. For instance, a first task may be associated with a first amount of precision that is greater than a second amount of precision associated with a second task. As an example, a first task may require a higher amount of precision (e.g., navigating to a position within one meter of a location, applying an amount of force to an object within a force range, etc.) that is greater than a lower amount of precision associated with the second task.

In another example, the information associated with the plurality of tasks may include amounts of time associated with performance or completion of one or more of the plurality of tasks or portions of the tasks. In yet another example, the information associated with the plurality of tasks may include a type of robotic device capable of performing one or more of the plurality of tasks (e.g., a robotic device with a given functionality or feature).

At block 508, the method 500 includes the computing system optimizing an allocation of the plurality of tasks to one or more robotic devices of the plurality of robotic devices based on the information associated with respective health levels for the plurality of robotic devices. In the instance in which a first task is associated with a first amount of precision that is greater than a second amount of precision associated with a second task, the computing system may allocate the first task to a first robotic device having a first health level that is greater than a second health level of a second robotic device. For example, the first robotic device may be newer or younger than the second robotic device and the first task may accordingly be allocated to the first robotic device. In some examples, the second task may be allocated to the second robotic device.

Although the example is described with respect to a first and second robotic device, the example is not meant to be limiting. The method 500 may apply to any number of tasks as well as any number of robotic devices. In some instances, more than one task may be allocated to a given robotic device. In another instance, no tasks may be allocated to any of the plurality of robotic devices.

In one instance, the method 500 may also include determining information associated with capabilities of the plurality of robotic devices and optimizing the allocation of the plurality of tasks to one or more of the robotic devices based on the capabilities of the robotic devices (e.g., delivering objects, picking up objects with different grips, navigating through an area, throwing an object, capturing an image of an object, etc.).

For example, a first robotic device may initially be capable of performing a number of tasks or functions with a resulting amount of precision (e.g., 10 different tasks/functions). Over time, the robotic device may degrade, due to wear and tear for example, such that the first robotic device is capable of performing a lesser number of tasks at a later instance in time with a same (or greater/lessor) amount of precision. Based on the health level for the first robotic device, the computing system may identify the decrease in number of tasks the first robotic device is capable of performing, and in the future, allocate tasks to the first robotic device that the first robotic device is still capable of performing. Thus, the allocation may be optimized based on the capabilities as well as the information associated with the respective health levels for the plurality of robotic devices.

In some examples, the method 500 may be performed by a server (e.g., a server in a cloud). The information associated with task logs may be received by the server and stored in a database. A computing system of the server may receive the information associated with the task logs, determine the information associated with health levels and the information associated with the plurality of tasks, and optimize the allocation of the plurality of tasks to one or more robotic devices.

In some examples, the method 500 may be performed by a robotic device. For example, the robotic device may query a server for information associated with task logs. A computing system of the robotic device may receive the information associated with the task logs, determine the information associated with health levels and the information associated with the plurality of tasks, and optimize the allocation of the plurality of tasks to one or more robotic devices. In one instance, the robotic device may allocate one or more tasks to itself as well as one or more tasks to the one or more robotic devices.

In other examples, the computing system may determine the health levels for the plurality of robotic devices and a user may optimize the allocation of the plurality of tasks based on the information determined by the computing system. For example, a user may observe information associated with a health level for each of the plurality of robotic devices on a display, as well as information associated with the plurality of tasks, and optimize and allocation of the plurality of tasks to one or more robotic devices.

In some examples, the display may be accessed via a web interface connected to a server and the computing system in a cloud. The display may include statistics associated with a group (such as any robotic device that is available to perform a task at an instance in time) or each of the plurality of robotic devices such that a user may quickly discern a health level of a given robotic device relative to the respective health levels of the plurality of robotic devices. For example, statistics for a given robotic device may include percentile graphs indicating a health level (or other statistic) of a robotic device relative to the respective health levels of the plurality of robotic devices. In other examples, the display may be provided on a display associated with a robotic device and configured to receive information from the server in the cloud.

Figure 6:
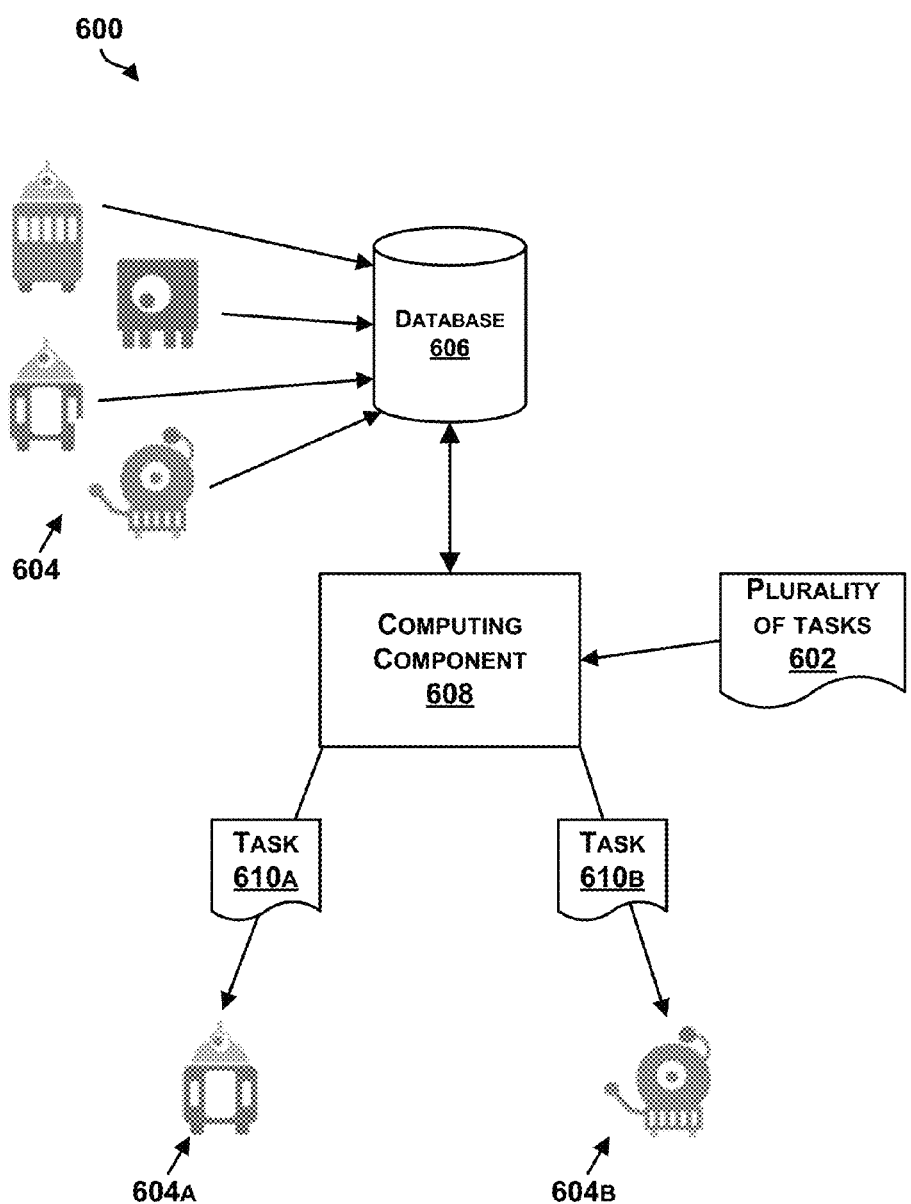
FIG. 6 is a flow diagram illustrating an example method of allocating a plurality of tasks to one or more robotic devices.

FIG. 6 is a flow diagram 600 illustrating an example method of allocating a plurality of tasks 602 to one or more robotic devices 604. In one example, the robotic devices 604 may send information indicating a status, such as an availability to perform a task to a database 606. The information may be sent by the robotic devices 604 to the database 606 in real-time, periodically, or sporadically, in some examples. For example, a fleet of robotic devices may be connected to the database 606 via a wired or wireless network and transmit information to the database 606. In other examples, the information may be derived by a computing component

608 based on information associated with tasks assigned to the robotic devices 604, such as a schedule or log of task allocations stored in the database 606.

Additionally, the computing component 608 may also receive information associated with task logs for the robotic devices 604 from the database 606. The computing component 608 may determine information associated with a health level for the robotic devices 604 based on the information associated with the task logs. Furthermore, the computing component 608 may receive or determine information associated with the plurality of tasks 602 to be performed by the robotic devices 604.

In some examples, the computing component 608 may optimize an allocation of the plurality of tasks 602 to one or more of the robotic devices 604 based on the information indicating statuses of the robotic devices 604 and the determined respective health levels for the robotic devices 604.

For example, the computing component 608 may send information to a robotic device 604a instructing the robotic device 604a to perform a first task 610a, and send information to another robotic device 604b instructing the other robotic device 604b to perform a second task 610b. The computing component 608 or database 606 may receive from the robotic device 604a an indication of the robotic device 604a performing the first task 610a.

In a further example, the robotic device 604a may also send information associated with a task status of the first task 610a to the computing component 608 or database 606. In one instance, the task status may include information sent by the robotic device 604a indicating whether the first task 610a is completed or information describing an update of completion of the task. In another instance, the computing component 608 may determine whether the task 610a is completed based on information sent to the database 606 from sensors of the robotic device 604a or sensors configured to determine when the task 610a is completed.

Figure 7:
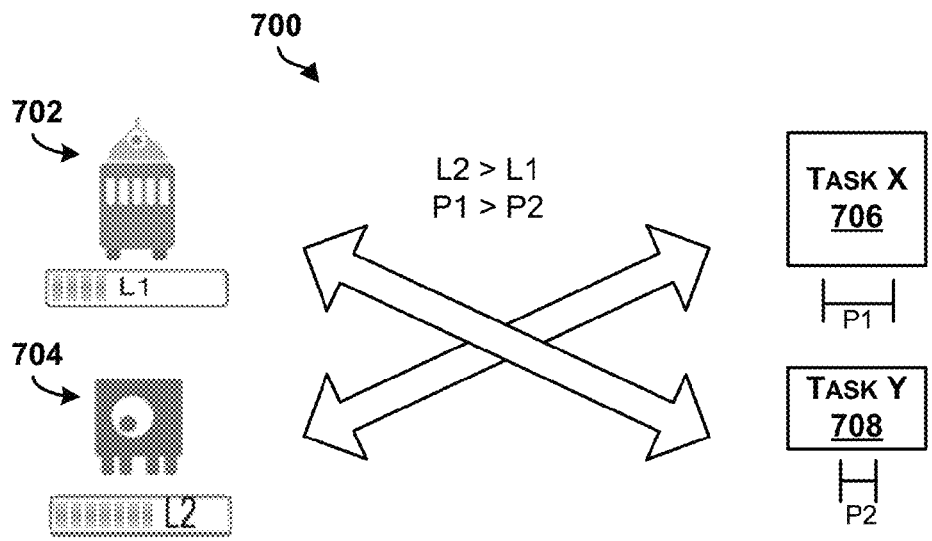
FIG. 7 is an example conceptual diagram of an optimized allocation of tasks to a pair of robotic devices.

FIG. 7 is an example conceptual diagram 700 of an optimized allocation of tasks to a pair of robotic devices 702, 704. In one instance, determined information associated with respective health levels for a plurality of robotic devices may include estimates of an expected remaining lifespan for the plurality of robotic devices. In one example, the plurality of robotic devices may include the pair of robotic devices 702, 704, and the pair may include a first robotic device 702 having an associated expected remaining lifespan 'L1' and a second robotic device 704 having an associated expected remaining lifespan 'L2' that is greater than 'L1'. In one example, the first robotic device 702 and second robotic device 704 may be same or similar robotic devices; however, the expected remaining lifespan 'L1' may be less than the expected remaining lifespan 'L2' because the robotic device 702 may have performed more tasks than the second robotic device 704 or may have been re-calibrated at a first date that is less recent than a second date at which the second robotic device was re-calibrated. The expected lifetime may indicate an amount of time before a next maintenance is due on the robotic device, for example.

In one example, information associated with the tasks to be performed by the pair of robotic devices 702, 704 may include a first task 706 and a second task 708 with associated amounts of precision 'P1' and 'P2' respectively. 'P1' might be greater than 'P2' indicating the first task 706 may require a greater amount of precision than the second task 708. A computing component and/or a user may optimize an allocation of the first task 706 and the second task 708 to the pair of robotic devices based on the amounts of precision 'P1' and 'P2' and the information associated with respective health levels for the pair of robotic devices. For example, the computing system may determine that the second robotic device 704 is capable of performing a function more precisely based on a relationship between a lifespan of a robotic device and a level of ability of the robotic device. As an example, the relationship between lifespan and level of ability may be that a level of ability to perform a function precisely decreases (e.g., decreases linearly, exponentially, etc.) over a lifespan of a given robotic device. Thus, in some examples, the optimized allocation may include an allocation of the second task 708 to the first robotic device 702 and an allocation of the first task 706 to the second robotic device 704.

Figure 8:
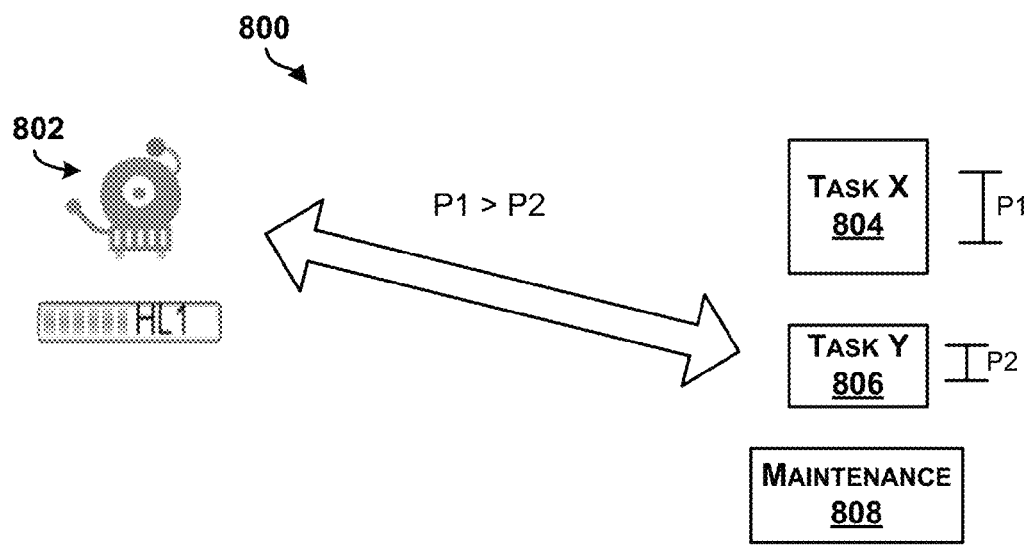
FIG. 8 is an example conceptual diagram of an optimized allocation of a task to a robotic device.

In other examples, a computing component (or a user) may also optimize tasks/functions a robotic device may perform as well as scheduling of maintenance appointments for the robotic device as characteristics of the robotic device change over time. FIG. 8 is an example conceptual diagram 800 of an optimized allocation of a task to a robotic device 802. In an instance in which information associated with capabilities of the robotic device 802 is determined, the information associated with the capabilities may also be modified based on the information associated with respective health levels for the robotic devices. For example, the information may be demoted in some examples in order to portray a more accurate level of reliability associated with how the robotic device 802 may be expected to perform given a current state of the robotic device 802 (as opposed to a state when the robotic device 802 is new, refurbished, re-calibrated, etc.).

For example, information associated with capabilities for a given robotic device may be demoted over time. As a determined health level for a given robotic device decreases over time, the capabilities of the robotic device may be demoted. In one example, a robotic device that may have been able to perform high precision tasks (e.g., assembling an object as part of a manufacturing process), may later be demoted to being capable of delivering objects from one area to another area (e.g., due to broken or malfunctioning components necessary for the assembly).

As shown in FIG. 8, a health level 'HL1' may be determined for the robotic device 802. In one instance, the robotic device 802 may have previously performed a first task 804 associated with a first amount of prevision 'P1'. Given the health level, 'HL1', a computing component or a user may determine that the robotic device 802 may no longer be suitable for performing the first task 804, due to an assumed or observed loss in an ability of the robotic device 802 to move accurately over time, for example. However, the robotic device 802 may be capable of performing a second task 806 associated with a second amount of precision 'P2'. In one example, the second amount of precision 'P2' may be less than the first amount 'P1'.

In a further instance, the robotic device 802 may require maintenance (e.g., re-calibration, updating, refurbishing, etc.) in order to perform the first task 804 in the future. However, rather than scheduling the robotic device to perform maintenance prior to performing any more tasks, the robotic device 802 may be tasked to perform the second task 806 a number of times before the robotic device 802 is scheduled for maintenance. Thus, in some examples, lower precision tasks may be assigned to a robotic device that is near failure (e.g., no longer capable of performing a task which the robotic device was originally designated or designed to perform) to maximize a utility of the robotic device and reduce maintenance appointments.

In other examples, determined information associated with respective health levels for the plurality of robotic devices may be employed to optimize the scheduling of maintenance 808 appointments for the plurality of robotic devices. In one instance, information associated with task logs for the plurality of robotic devices may be used to determine a number of times a robotic device (or type of robotic device) may be expected to perform a function or task within a given amount of tolerance before failing. In some examples, the expected number and a number of tasks the robotic device has performed may be used to determine when a robotic device should be scheduled for maintenance.

In another instance, received information associated with maintenance logs, e.g., information recorded when a robotic device is repaired indicating how many tasks or what type of tasks the robotic device performed prior to the repair, may be used to optimize the scheduling of future maintenance appointments. This may be beneficial in order to minimize failures of one or more of the plurality of robotic devices during execution of tasks as well as in order to maximize the utility of the plurality of robotic devices between maintenance.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

The invention claimed is:

1. A method comprising:
receiving task log information for a plurality of robotic devices, wherein the plurality of robotic devices comprises a first robotic device and a second robotic device;
in a computing system configured to access a processor and a memory, determining a heath level for each of the plurality of robotic devices based on the task log information, wherein the health level for the robotic device comprises an estimate of an expected remaining amount of time until maintenance of the robotic device;
determining, for a plurality of tasks to be performed by one or more of the plurality of robotic devices, a first amount of force precision for a first task and a second amount of force precision for a second task, wherein the first amount of force precision is more precise than the second amount of force precision; and
based on the determined health level for each of the plurality of robotic devices and the determined first and second amount of force precision for the first and second task, the computing system allocating the first task having the more precise first amount of force precision to the first robotic device having a first health level that is greater than a second health level of the second robotic device; and
the computing system communicating instructions to the first robotic device to perform the allocated first task.

2. The method of claim 1, wherein the second task is allocated to the second robotic device based on the determined health level for each of the plurality of robotic devices and the determined first and second amount of force precision for the first and second task.

3. The method of claim 1, further comprising:
determining robotic device capability information for the plurality of robotic devices; and
allocating the plurality of tasks to the one or more robotic devices based on the robotic device capability information and the respective health levels for the plurality of robotic devices.

4. The method of claim 3, further comprising:
modifying the robotic device capability information for the plurality of robotic devices based on the respective health levels for the plurality of robotic devices, wherein the robotic device capability information for the plurality or robotic devices is demoted over time.

5. The method of claim 1, wherein the force precision specifies a force range for a task.

6. The method of claim 5, further comprising:
allocating the plurality of tasks to the one or more robotic devices based on amounts of time associated with performance of the plurality of tasks and the respective health levels for the plurality of robotic devices.

7. The method of claim 5, further comprising:
receiving maintenance log information for the plurality of robotic devices; and
scheduling maintenance appointments for the plurality of robotic devices based on the respective health levels for the plurality of robotic devices and the maintenance log information.

8. The method of claim 1, further comprising:
the computing system receiving real-time information from the plurality of robotic devices indicating a status of the plurality of robotic devices, wherein the status of a given robotic device indicates an availability to perform a task; and
the computing system allocating the plurality of tasks to the one or more robotic devices based on the real-time information and the respective health levels for the plurality of robotic devices.

9. The method of claim 1, further comprising:
sending information to the first robotic device instructing the first robotic device to perform the first task;
receiving from the first robotic device an indication of the first robotic device performing the first task; and
receiving a task status of the first task, wherein the task status indicates whether the first task is completed.

10. A non-transitory computer readable memory having stored therein instructions executable by a computing device to cause the computing device to perform functions comprising:
receiving task log information for a plurality of robotic devices, wherein the plurality of robotic devices comprises a first robotic device and a second robotic device;
determining a heath level for each of the plurality of robotic devices based on the task log information, wherein the health level for the robotic device comprises an estimate of an expected remaining amount of time until maintenance of the robotic device;
determining, for a plurality of tasks to be performed by one or more of the plurality of robotic devices, a first amount of force precision for a first task and a second amount of force precision for a second task, wherein the first amount of force precision is more precise than the second amount of force precision; and based on the determined health level for each of the plurality of robotic devices and the determined first and second amount of force precision, allocating the first task having the more precise first amount of force precision to the first robotic device having a first health level that is greater than a second health level of the second robotic device; and communicating instructions to the first robotic device to perform the allocated first task.

11. The non-transitory computer readable memory of claim 10, further comprising instructions executable by the computing device to perform functions comprising:

determining robotic device capability information for the plurality of robotic devices; and allocating the plurality of tasks to the one or more robotic devices based on the robotic device capability information and respective health levels for the plurality of robotic devices.

12. The non-transitory computer readable memory of claim 11, further comprising instructions executable by the computing device to perform functions comprising:

modifying the robotic device capability information for the plurality of robotic devices based on the respective health levels for the plurality of robotic devices, wherein the robotic device capability information for the plurality of robotic devices is demoted over time.

13. The non-transitory computer readable memory of claim 10, wherein the force precision specifies a force range for a task.

14. The non-transitory computer readable memory of claim 13, further comprising instructions executable by the computing device to perform functions comprising:

receiving maintenance log information for the plurality of robotic devices; and scheduling maintenance appointments for the plurality of robotic devices based on the respective health levels for the plurality of robotic devices and the maintenance log information.

15. The non-transitory computer readable memory of claim 10, further comprising instructions executable by the computing device to perform functions comprising:

receiving real-time information from the plurality of robotic devices indicating a status of the plurality of robotic devices, wherein the status of a robotic device indicates an availability to perform a task; and allocating the plurality of tasks to the one or more robotic devices based on the real-time information and the respective health levels for the plurality of robotic devices.

16. A system comprising:

a computing component, comprising a processor and a memory coupled to the processor, wherein the computing component is capable of communicating with a plurality of robotic devices over a network, the computing component configured to:

receive task log information and maintenance log information for the plurality of robotic devices, wherein the plurality of robotic devices comprises a first robotic device and a second robotic device;

determine a heath level for each of the plurality of robotic devices based on the task log information, wherein the health level for the robotic device comprises an estimate of an expected remaining amount of time until maintenance of the robotic device;

determine, for a plurality of tasks to be performed by one or more of the plurality of robotic devices, a first amount of force precision for a first task and a second amount of force precision for a second task, wherein the first amount of precision is more precise than the second amount of precision;

based on the determined health level for each of the plurality of robotic devices and the determined first and second amount of force precision, allocate the first task having the more precise first amount of force precision to the first robotic device having a first health level that is greater than a second health level of the second robotic device; and communicate the allocated first task to the first robotic device; and a plurality of robotic devices, configured to:

receive via the network from the computing component instructions for performing one or more tasks; and transmit a status of the one or more tasks to the computing component via the network, wherein the status indicates whether the one or more tasks are completed.

17. The system of claim 16, wherein the force precision specifies a force range for a task.

18. The system of claim 17, wherein the computing component is further configured to allocate the plurality of tasks to the one or more robotic devices based on amounts of time associated with performance of the plurality of tasks and the respective health levels for the plurality of robotic devices.

19. The system of claim 16, wherein the computing component is further configured to:

schedule maintenance appointments for the plurality of robotic devices based on the respective health levels for the plurality of robotic devices and maintenance log information.

20. The system of claim 16, wherein the computing component is further configured to:

determine robotic device capability information for the plurality of robotic devices; and allocate the plurality of tasks to the one or more robotic devices based on the robotic device capability information and the respective health levels for the plurality of robotic devices.

* * * * *